United States Patent
Bartlett et al.

(10) Patent No.: US 10,045,236 B1
(45) Date of Patent: Aug. 7, 2018

(54) DYNAMIC DATA FRAME CONCATENATION BASED ON EXTENT OF RETRANSMISSION

(71) Applicant: Sprint Spectrum L.P., Overland Park, KS (US)

(72) Inventors: Roger D. Bartlett, Merriam, KS (US); Hal S. Beech, Olathe, KS (US); Pierce A. Gorman, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 197 days.

(21) Appl. No.: 14/611,913

(22) Filed: Feb. 2, 2015

(51) Int. Cl.
| | |
|---|---|
| H04J 3/00 | (2006.01) |
| H04W 24/08 | (2009.01) |
| H04L 1/18 | (2006.01) |
| H04W 4/18 | (2009.01) |
| H04W 56/00 | (2009.01) |
| H04M 7/00 | (2006.01) |
| H04W 88/08 | (2009.01) |

(52) U.S. Cl.
CPC .......... *H04W 24/08* (2013.01); *H04L 1/1864* (2013.01); *H04M 7/0084* (2013.01); *H04W 4/18* (2013.01); *H04W 56/001* (2013.01); *H04W 88/08* (2013.01)

(58) Field of Classification Search
CPC ..... H04W 24/08; H04W 56/001; H04W 4/18; H04M 7/0084
USPC ...................................................... 370/336
See application file for complete search history.

(56) References Cited

U.S. PATENT DOCUMENTS

| | | | |
|---|---|---|---|
| 6,483,805 B1* | 11/2002 | Davies | H04L 41/142 370/235 |
| 8,244,810 B1 | 8/2012 | Haldar | |
| 8,670,788 B1 | 3/2014 | Vargantwar et al. | |
| 8,837,271 B1 | 9/2014 | Mansour et al. | |
| 2004/0181740 A1* | 9/2004 | Tomaru | H04L 1/1812 714/776 |
| 2004/0220803 A1* | 11/2004 | Chiu | G10L 19/00 704/214 |
| 2009/0073959 A1* | 3/2009 | Xu | H04L 65/607 370/352 |
| 2011/0090850 A1* | 4/2011 | So | H04L 1/0007 370/328 |
| 2012/0213150 A1* | 8/2012 | Oguz | H04W 72/1215 370/328 |

OTHER PUBLICATIONS

Persson, Fredrik, "Voice over IP Realized for the 3GPP Long Term Evolution," IEEE 66th Vehicular Technology Conference, pp. 1436-1440, Sep. 30, 2007-Oct. 3, 2007.

* cited by examiner

Primary Examiner — Mang Yeung (57) ABSTRACT

A transmitting device may use a determined extent of retransmissions by the transmitting device to a receiving device as a basis to decide on an extent of concatenation of frames of media. In one example, a transmitting device may monitor an extent of retransmissions by the transmitting device to a receiving device during a packet-based real-time media session. The transmitting device may detect a threshold low extent of retransmissions during the packet-based real-time media session. And responsive to detecting the threshold low extent of retransmissions, the transmitting device may increase an extent of concatenation of frames of media during the packet-based real-time media session.

10 Claims, 4 Drawing Sheets

DYNAMIC DATA FRAME CONCATENATION BASED ON EXTENT OF RETRANSMISSION

BACKGROUND

Unless otherwise indicated herein, the description provided in this section is not itself prior art to the claims and is not admitted to be prior art by inclusion in this section.

A typical cellular wireless network includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In an example arrangement, the network infrastructure may include one or more packet data network gateways (PGWs) or similar components that provide connectivity with a packet-switched network so as to support various communication services. For instance, the infrastructure may include gateways that support general packet-data communications, such as general web browsing, file transfer, and the like, and/or packet-based real-time media communications such as voice over Internet Protocol (VoIP) and streaming media for instance.

A representative PGW may sit as a node on a wireless service provider's private packet-switched network and may thus provide connectivity with various application servers and other entities on that private network, and with other such entities accessible through a connection between the service provider's network and one or more other networks such as the public Internet. By way of example, such a PGW may provide connectivity with an Internet Multimedia Subsystem (IMS) platform or other session server that supports VoIP calling and/or other such media services.

When a UE first enters into the coverage of cellular wireless network, the UE engages in a process of registering or "attaching" with the network, which may trigger setup of various communication channels for the UE and/or reservation of various communication resources for the UE. For instance, upon first detecting coverage of a base station, the UE may transmit an attach request message to the base station, which the base station may forward to a network controller such as a mobility management entity (MME). Upon authenticating and authorizing the UE, the network controller may then engage in further signaling with the base station and with a serving gateway (SGW), which may in turn engage in signaling with a PGW, ultimately resulting in setup of one or more bearer connections or "bearers" each extending, via the base station, between the UE and the PGW, through which the UE can then engage in packet-data communication via the PGW.

In practice, a network such as this may initially establish for a UE one or more default bearers to enable the UE to engage in certain basic communications, with each default bearer having a respective quality of service level. By way of example, the network may initially establish for the UE a default Internet bearer with a best-efforts quality of service level, for use by the UE to engage in general Internet communications such as web browsing, e-mail messaging, and the like. Further, if the UE subscribes to VoIP service or another such service that would be served by an IMS, the network may initially establish for the UE a default IMS signaling bearer with a medium quality of service level, for use by the UE to engage in session setup signaling (such as Session Initiation Protocol (SIP) signaling) with the IMS to facilitate setup of VoIP calls or the like.

Further, as the UE is served by the network, the network may establish for the UE additional bearers as needed. For example, if the UE has an IMS signaling bearer and the UE engages in signaling over that bearer with an IMS to set up a packet-based real-time media session such as a VoIP call, the network may then establish for the UE a dedicated IMS bearer with a high quality of service level, for carrying media content of the session, such as VoIP voice packets, to and from the UE. Once the dedicated IMS bearer is established, the UE may then send and receive media content of the session over that dedicated IMS bearer.

By way of example, during a VoIP call, a UE may send and receive voice frames to a remote network entity using the dedicated IMS bearer. To communicate with the remote network entity, the UE may send and receive the voice frames to a base station serving the UE over an air interface. Each of the voice frames may be of a particular length and correspond to a particular portion of a voice signal. For instance, in an example implementation, each voice frame may correspond to a 20-millisecond portion of speech. Additionally, each voice frame is typically packetized into a single data packet (e.g., a Real-time Transport Protocol (RTP) packet) along with various associated headers, and each such data packet may be scheduled for transmission individually. In order to maintain a continuous flow of the voice frames during the VoIP call and keep the voice delivery in approximately real-time, the voice frames may be communicated at largely the rate defined by the voice frame length. As an example, where each voice frame corresponds to 20 ms, the voice frames may be communicated at largely a rate of approximately one voice frame per 20 ms.

Further, in some wireless communication systems, when data that is transmitted by a transmitting entity to a receiving entity is not received by the receiving entity, or is received by the receiving entity with one or more errors, the data may be retransmitted. The retransmission of data could occur either automatically or in response to feedback from the receiving entity. For example, in Long Term Evolution (LTE) systems, and in other systems, a Hybrid Automatic Repeat Request (HARQ) procedure is used. In the HARQ approach, after a transmitting entity has transmitted a block of data, the transmitting entity waits to receive an HARQ response from the receiving entity. If the transmitting entity receives a positive acknowledgement (ACK) as the HARQ response, then no-retransmission is needed and the transmitting entity can transmit additional data. If the transmitting entity receives a negative acknowledgement (NACK) as the HARQ response, then the transmitting entity retransmits the data. The transmitting entity may also retransmit the data if the transmitting entity does not receive any HARQ response within a certain period of time.

This retransmission approach can allow data to be successfully transmitted from a transmitting entity to a receiving entity even when there is a substantial probability that the transmitted data will be received with one or more errors, for example, because of poor radio frequency (RF) conditions. Specifically, the data can be retransmitted multiple times until the data is received without errors. This retransmission approach, however, also increases latency. For example, there can be a period of delay between when the transmitting entity transmits data and when the transmitting entity receives a NACK response from the receiving entity and another period of delay between when the transmitting entity receives the NACK response and when the transmitting entity begins retransmitting the data.

During a VoIP call, there may be an overall acceptable delay tolerance (e.g., 200 ms) between a time when a voice frame is spoken at one end of a conversation to a time when a data packet corresponding to the voice frame is received and decoded the other end of the conversation. A portion (e.g., 41 ms) of the overall acceptable delay tolerance may be allocated to the physical RF link between a UE and a base station. With such a delay tolerance on the RF link, a certain number of retransmissions over the air interface may be tolerable for a single voice frame, while staying within the delay tolerance for the RF link, but any more retransmissions than that may result in dropping of the voice frame.

By way of example, if the base station is configured to retransmit data packets using an HARQ procedure, each retransmission may add 8 ms of delay: 4 ms waiting for a NACK response or non-response, and an additional 4 ms waiting to retransmit the data packet. With this example, two retransmissions of a 20-ms voice frame would add 16 ms of delay, such that the total delay due to digitizing the voice frame and the retransmissions would be 36 ms, which is within the 41-ms tolerance. On the other hand, three retransmissions of a 20-ms voice frame would add 24 ms of delay, such that the total delay due to digitizing the voice frame and the retransmissions would be 44 ms, which exceeds the 41-ms delay tolerance.

OVERVIEW

As a general matter, a wireless service provider may wish to have each of its wireless coverage areas support as many concurrent packet-based real-time media sessions as possible. For instance, a wireless service provider may wish to provide as many concurrent VoIP calls as possible, so as to provide voice telephony service concurrently to as many UEs as possible.

One issue with achieving this goal, however, is that the number of concurrent VoIP users per base station is limited by the number of scheduling instances (e.g., downlink control information (DCI) messages) available on a control channel provided by the base station. Such scheduling instances carry detailed information that enables a UE to identify and decode data transmitted by the base station over a traffic channel. And as mentioned above, during a VoIP call, each packetized voice frame is individually scheduled for transmission. In other words, a base station ordinarily uses an individual scheduling instance for each transmitted voice frame.

Consequently, it would be beneficial to combine multiple voice frames into a single packet for transmission during a VoIP call. Doing so may reduce load on the control channel by reducing the number of scheduling instances. By way of example, sending two consecutive voice frames within a single data packet rather than sending each voice frame within an individual data packet would reduce the number of scheduling instances by half. This in turn would approximately double the maximum number of concurrent VoIP users per base station.

Unfortunately, however, any retransmission of such a combination of voice frames could exceed the delay tolerance on the RF link. For instance, if each voice frame is 20 ms long, the combined voice frames would represent 40 ms of speech. And if a retransmission would add 8 ms of delay (4 ms of waiting for a response such as a NACK response and 4 ms waiting to retransmit the data packet), then the total delay due to digitizing the speech and the retransmission would be 48 ms. This 48-ms delay would exceed any RF link delay tolerance that is less than 48 ms, such as the 41-ms RF delay tolerance contemplated above.

Disclosed herein are methods and corresponding systems to help manage wireless communication in a manner that increases the number of concurrent packet-based real-time media sessions (e.g., VoIP calls). In accordance with this disclosure, a transmitting device may monitor an extent of retransmissions by the transmitting device to a receiving device over time during a packet-based real-time media session. In response to detecting a threshold low extent of retransmissions during the packet-based real-time media session, the transmitting device may begin to concatenate frames of media together and transmit the concatenated frames of media together within multi-frame data packets during the packet-based real-time media session. Upon then detecting no longer the threshold low extent of retransmissions (or detecting a threshold high extent of retransmissions) during the packet-based real-time media session, the transmitting device may then revert to transmitting frames of media without concatenation.

In one example implementation, a base station of a radio access network (RAN) may determine that, for a defined time period, a number of retransmissions by the base station to the UE during a packet-based real-time media session with the UE is less than a predefined threshold number. And in response to determining that the number of retransmissions by the base station is less than the predefined threshold number, the base station may then begin concatenating frames of media together for transmission to the UE during the packet-based real-time media session.

Alternatively, in another example implementation, the transmitting device may be a UE that transmits data packets to a base station during a packet-based real-time media session. For instance, the UE may determine that, for a defined time period, a number of retransmissions by the UE to the base station during the packet-based real-time media session is less than a predefined threshold number. And in response to determining that the number of retransmissions by the UE is less than the predefined threshold number, the UE may then begin concatenating frames of media together for transmission to the base station during the packet-based real-time media session.

Further, in another aspect, the disclosure provides that the transmitting device may dynamically set a length of the defined time period based on load information, time of day, day of the week, etc., in a manner that causes the transmitting device to more or less frequently transition to concatenating data packets depending on the desired implementation. For example, as described herein, a base station or other network entity may monitor an extent of retransmissions during a sliding window of time, and decrease a length of the sliding window during periods of heavy congestion, such that the base station and/or UEs are more likely to transition to concatenating data frames and decrease the scheduling load on the base station.

To appreciate this result, consider a scenario in which the number of retransmissions by a transmitting device is fairly constant over time and the transmitting device begins concatenating data frames upon detecting that a number of retransmissions during the defined time period is less than a predefined threshold number (e.g., one). In such a scenario, the number of retransmissions by the transmitting device during the defined time period is likely to be proportional to the length of the defined time period. Put another way, a first number of retransmissions detected during a first time period is likely to be greater than a second number of retransmissions detected during a second, shortened time period. It follows that the number of retransmissions is more likely to be less than the predefined threshold number if the number of retransmissions is measured over the span of the second (shorter) time period than if the number of retransmissions is measured over the span of the first (longer) time period. And further, the transmitting device is more likely to begin concatenating data frames if the number of retransmissions is measured during the second (shorter) time period than if the number of retransmissions is measured during the first (longer) time period.

Accordingly, in one respect, disclosed is a method for managing wireless communication in a radio access network (RAN) in which a transmitting device engages in a packet-based real-time media session with a receiving device over an air interface. The transmitting device may be configured to retransmit data packets to the receiving device during the packet-based real-time media session in accordance with an automatic repeat request (ARQ) procedure. In accordance with the method, the transmitting device monitors an extent of retransmissions by the transmitting device to the receiving device over time during the packet-based real-time media session. Further, the transmitting device detects a threshold low extent of retransmissions by the transmitting device to the receiving device during the packet-based real-time media session. And responsive to detecting the threshold low extent of retransmissions, the transmitting device increases an extent of concatenation of frames of media during the packet-based real-time media session.

In another respect, disclosed is a base station that may include an antenna structure that radiates to define a coverage area for serving UEs, and may further include a controller that manages wireless communication via the antenna structure. The controller may include at least one processing unit, data storage, and program instructions stored in the data storage and executable by the at least one processing unit to carry out various functions. In an example implementation, the functions may include: (a) determining, for a defined time period, an extent of retransmissions by the base station to a UE during a packet-based real-time media session with the UE; (b) using the determined extent of retransmissions as a basis to decide on an extent of concatenation of frames of media; and (c) causing the base station to transmit, in accordance with the decision, at least one data packet to the UE.

Further, in another respect, disclosed is a method for managing wireless communication in a RAN in which a base station communicates a sequence of data packets to a UE over an air interface. The base station may be configured to transmit particular data packets of the sequence of data packets to the UE in accordance with an ARQ procedure. In accordance with the method, the base station determines, for a defined time period, an extent of retransmissions by the base station to the UE. The base station then uses the determined extent of retransmissions as a basis to decide on an extent of concatenation of frames of data. And the base station transmits, in accordance with the decision, at least one data packet of the sequence of data packets to the UE.

These as well as other aspects, advantages, and alternatives will become apparent to those of ordinary skill in the art by reading the following detailed description, with reference where appropriate to the accompanying drawings.

Further, it should be understood that the descriptions provided in this overview and below are intended to illustrate the invention by way of example only and not by way of limitation.

DETAILED DESCRIPTION

This disclosure will focus primarily on LTE communication and particularly on concatenating frames of data transmitted by a UE or a base station during a packet-based real-time media session. However, principles of the disclosure can apply in other contexts as well, including with respect to other types of air interfaces (beyond LTE), and with respect to data communication occurring during other types of sessions (beyond packet-based real-time media sessions). Further, even within the context of the disclosed implementation(s), numerous variations are possible. For instance, various described machines, connections, functions, and other elements may be added, omitted, distributed, re-located, re-ordered, combined, or changed in other ways.

Referring to the drawings, as noted above, FIG. 1 is a simplified block diagram of an example network arrangement in which features of the present disclosure can be implemented. In particular, the figure depicts an example RAN 12 as an LTE network that is arranged to serve UEs and to provide connectivity with a packet-switched network 14.

Figure 1:
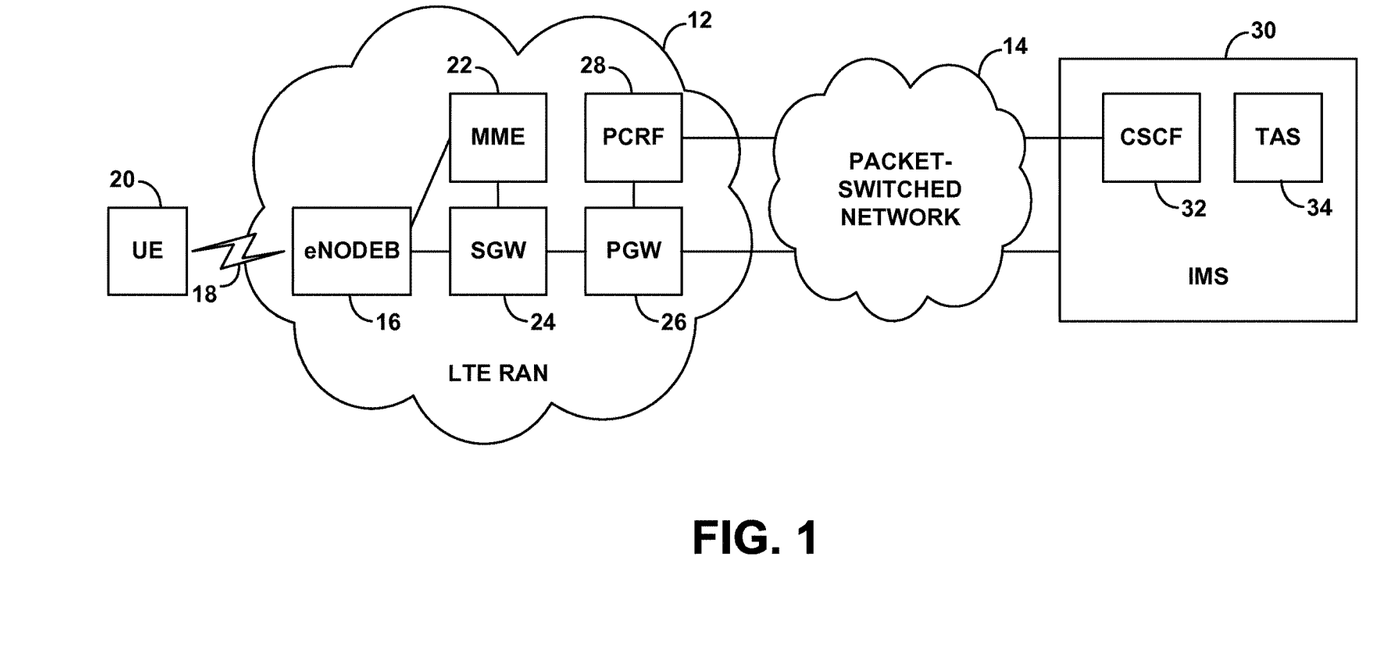
FIG. 1 is a simplified block diagram of a network in which the features of the present disclosure can be implemented.

As shown, the example LTE network includes an eNodeB (base station) 16 that radiates to provide air interface 18 through which to serve UEs, such as a representative UE 20 (e.g., a cell phone a wirelessly-equipped computer, a tracking device, an embedded wireless communication module, or any other type of wireless communication device). Further, the LTE network includes a mobility management entity (MME) 22 that has a communication interface with the eNodeB and a SGW 24 that has communication interfaces with the eNodeB and the SGW. And still further, the LTE network includes a PGW 26 that has a communication interface with the SGW and that provides connectivity with the packet-switched network, and a policy and charging rules function (PRCF) 28 that has a communication interface with the PGW.

As further shown, the example arrangement includes an IMS platform 30 accessible via the packet-switched network, which functions to support VoIP call connections such as voice over LTE (VoLTE) calls and other such packet-based real-time media sessions. As shown, the IMS platform includes a Call Session Control Function (CSCF) 32 and a Telephony Application Server (TAS) 34. Further, the CSCF has a communication interface (e.g., via the packet-switched network) with the PCRF 28 of the LTE network, to facilitate working with the LTE network to set up VoLTE calls and other sessions for served UEs.

In accordance with LTE, when the UE enters into coverage of the eNodeB 16, the UE and LTE network may engage in an initial attach process through which the LTE network establishes for the UE one or more bearers extending between the UE and the PGW, for carrying data communications between the UE and the packet-switched network. In typical practice, for instance, the network may establish for the UE at least a default Internet bearer for carrying general "best efforts" data traffic (such as web browsing traffic, file transfer traffic, and messaging traffic) between the UE and various remote network entities. Further, if the UE subscribes to VoLTE service, the network may also establish for the UE an IMS signaling bearer for carrying VoLTE call setup signaling such as SIP signaling between the UE and the IMS platform.

This initial setup of one or more bearers for the UE involves establishing for each bearer a respective virtual tunnel that includes a radio link tunnel extending between the UE and the eNodeB and a backhaul tunnel extending between the eNodeB and the PGW via the SGW. Further, the process involves establishing for the UE a logical Radio Resource Configuration (RRC) encompassing the one or more radio link portions.

In turn, if and when the UE seeks to place a voice call or the IMS platform seeks to connect a voice call to the UE, the UE and IMS platform may engage in a process to set up that voice call as a VoIP call and thus as a VoLTE call. In particular, the UE and IMS platform may exchange SIP signaling, which would flow through the UE's IMS signaling bearer, through the packet-switched network 14, and through the CSCF 32, in order to establish a packet-based real-time media session extending between the UE and the TAS or other node.

Further, in response to this SIP signaling, the CSCF may signal to the PCRF to notify the PCRF that a VoIP call for the UE is being established, and the PCRF may responsively signal to the PGW to cause the PGW to trigger setup for the UE of a dedicated IMS bearer for carrying VoLTE data traffic (namely, data representing speech). To set up this dedicated IMS bearer, the PGW may signal to the SGW, the SGW may signal to the MME, and the MME may signal to the eNodeB and SGW. Further, the eNodeB may responsively transmit to the UE an "RRC Connection Reconfiguration" message that notifies the UE of the addition of the dedicated IMS bearer to the UE's RRC connection. The eNodeB may then serve the UE over the air interface with VoLTE call communication, with the VoLTE call data (voice data) passing between the UE and the IMS platform via the UE's dedicated IMS bearer and via the packet-switched network.

In accordance with a recent version of LTE, the air interface on both the downlink and the uplink spans a particular frequency bandwidth (such as 1.4 MHz, 3 MHz, 5 MHz, 10 MHz, or 20 MHz) that is divided primarily into subcarriers spaced apart from each other by 15 kHz. Further, the air interface is divided over time into a continuum of 10-millisecond frames, with each frame being further divided into ten 1-millisecond subframes or transmission time intervals (TTIs) that are in turn each divided into two 0.5-millisecond segments. In each 0.5-millisecond segment or in each 1-millisecond TTI, the air interface is then considered to defined a number of 12-subcarrier wide "resource blocks" spanning the frequency bandwidth (i.e., as many as would fit in the given frequency bandwidth). In addition, each resource block is divided over time into symbol segments of 67 μs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the eNodeB to UEs, and other resource elements are reserved to define a physical downlink shared channel (PDSCH) for carrying bearer data transmissions from the eNodeB to UEs. Likewise, on the uplink, certain resource elements across the bandwidth are reserved to define a physical uplink control channel (PUCCH) for carrying control signaling from UEs to the eNodeB, and other resource elements are reserved to define a physical uplink shared channel (PUSCH) for carrying bearer data transmissions from UEs to the eNodeB.

In LTE, the eNodeB manages scheduling of the PUSCH and PDSCH resources to carry data communications to and from UEs on an as-needed basis. In particular, when a UE has data to transmit to the eNodeB, the UE may transmit a scheduling request to the eNodeB, and the eNodeB may responsively allocate one or more upcoming resource blocks on the PUSCH to carry that data and transmit on the PDCCH to the UE a DCI message that directs the UE to transmit the data in the allocated resource blocks, and the UE may then do so. Likewise, when the eNodeB has data to transmit to the UE, the eNodeB may allocate PDSCH resource blocks to carry that data and may transmit on the PDCCH to the UE a DCI message that directs the UE to receive the data in the allocated resource blocks, and the eNodeB may thus transmit the data in the allocated resource blocks to the UE.

As discussed above, the eNodeB may ordinarily use an individual DCI to schedule each data packet transmitted during a packet-based real-time media session. For instance, during a VoLTE call, the eNodeB may individually schedule each packetized voice frame for transmission. And, in practice, the eNodeB may only be available to provide a limited number of DCI messages on the PDCCH per subframe. Consequently, the number of concurrent packet-based real-time media sessions that the eNodeB can support is limited by the maximum number of DCI messages that the eNodeB can provide on the PDCCH.

Further, in line with the discussion above, one way of increasing the number of concurrent packet-based real-time media sessions that the eNodeB can support would be to combine multiple data frames of a packet-based real-time media session into a single packet for transmission over an RF link between the eNodeB and a UE. Doing so may reduce load on the control channel by reducing the number of DCI messages used to schedule the multiple data frames. By way of example, rather than using multiple individual DCI messages to schedule the multiple data frames respectively, the eNodeB could packetize the multiple data frames into a single packet, and use a single DCI message to schedule the single packet.

Unfortunately, however, any retransmission of such a combination of data frames could exceed a delay tolerance on the RF link. For instance, during a VoLTE call, there may be a 41-ms RF link delay tolerance and each data frame may be a 20-ms voice frame, such that a combination of two voice frames represents 40 ms of speech. Further, each retransmission may add 8 ms of delay (4 ms waiting for a response, and 4 ms waiting for the next transmission). In this example, the total delay due to one retransmission would be 48 ms, exceeding the 41-ms RF link delay tolerance.

In accordance with the present disclosure, as noted above, during a packet-based real-time media session, or more generally, during any data session in which a sequence of data packets are being communicated, the eNodeB or a UE may monitor an extent of retransmissions over time. The eNodeB or UE may then use the determined extent of retransmissions as a basis to decide on extent of concatenation of frames of media. And in turn, the eNodeB or UE may then transmit data packets during the data session in accordance with the decision.

As one example, the eNodeB may be engaged in a VoLTE call with a UE and may be transmitting single-frame data packets to the UE representing individual voice frames. During the VoLTE call, the eNodeB may monitor an extent of retransmissions by the eNodeB to the UE over time. Further, the eNodeB may detect a threshold low extent of retransmissions by the eNodeB to the UE. And in response to detecting the threshold low extent of retransmissions during the VoLTE call, the eNodeB may increase an extent of concatenation of frames of media.

For instance, the eNodeB may increase the extent of concatenation by transitioning from transmitting single-frame data packets to the UE to transmitting multi-frame data packets to the UE. Each of the multi-frame data packets may represent at least two concatenated voice frames. As an example, a multi-frame data packet frame may represent a first 20-ms voice frame as a well as a second 20-ms voice frame that is adjacent to the first 20-ms voice frame. In other words, the multi-frame data packet may represent 40 consecutive ms of speech. In another instance, the eNodeB may increase the extent of concatenation by transitioning from transmitting multi-frame data packets representing two concatenated voice frames to transmitting multi-frame data packets representing more than two concatenated voice frames (e.g., three concatenated voice frames within a single multi-frame data packet).

In practice, the eNodeB may detect the threshold low extent of retransmissions in various ways. By way of example, the eNodeB may detect that, for a defined time period, a number of retransmissions is less than a threshold number. For instance, the eNodeB may determine an average number of retransmissions during a sliding window of time (e.g., a 200-ms time period), and compare the number of retransmissions to a threshold number, such as one retransmission, two retransmissions, etc. In one scenario, the eNodeB may determine the number of retransmission by counting the number of retransmissions during the sliding window of time. Alternatively, if the eNodeB is configured to retransmit data packets in accordance with a HARQ procedure, the eNodeB could determine the number of retransmissions by counting the number of NACKs received from the UE, for example. Or the eNodeB could monitor the number of retransmissions by counting the number of ACKs and comparing the number of ACKs to the number of transmissions to the UE by the eNodeB. If the number of ACKs is equal to the number of transmissions, this may indicate that the UE has acknowledged receipt of each data packet transmitted by the eNodeB. On the other hand, if the number of ACKs is less than the number of transmissions, the difference between the number of ACKs and number of transmissions may be indicative of the number of retransmissions.

With this approach, where the eNodeB determines an extent of retransmissions during a defined time period and compares the extent of retransmissions to a threshold number, the eNodeB or another RAN entity may dynamically set a length of the defined time period based on load information, time of day, day of the week, etc. In line with the discussion above, decreasing the length of the defined time period may cause the eNodeB to transition more often to concatenating data frames, while increasing the length of the defined time period may cause the eNodeB to transition less often to concatenating data frames.

Accordingly, in one scenario, upon detecting that the eNodeB is heavily loaded, the eNodeB may decrease the length of the defined time period, such that the eNodeB more frequently transitions to concatenating data frames. For instance, if the defined time period is ordinarily 500 ms and the threshold number of retransmission is set to one, the eNodeB may decrease the length of the defined time period to 100 ms, such that the eNodeB may transition to transmitting multi-frame data packets upon detecting a 100-ms period without any retransmissions, rather than having to detect a 500-ms time period without any retransmissions. In one example, the eNodeB itself may monitor the load information and compare the load information to a threshold to determine whether the eNodeB is heavily congested. Alternatively, another RAN entity, such as an MME, may provide an indication to the eNodeB upon the MME detecting that the eNodeB is heavily congested.

In a similar manner, the length of the defined time period may be predefined by engineering design to vary with the time of day and/or day of the week. For instance, the defined time period may be shortened during times or days of above-average or peak eNodeB traffic and/or increased during times or days of below-average eNodeB traffic.

Additionally or alternatively, in another scenario, the eNodeB or another RAN entity may achieve similar results by dynamically setting the threshold number of retransmissions based on load information, time of day, day of the week, etc. For instance, the threshold number may ordinarily be one transmission during a defined time period of 500 ms. In order to cause the eNodeB to more frequently transition to concatenating data frames, the eNodeB may increase the threshold number of retransmissions to three retransmissions during the defined time period. In this manner, rather than having to detect a 500-ms period in which the eNodeB communicates data packets without any retransmissions before beginning to concatenate data frames, the eNodeB may instead begin concatenating data frames upon detecting a 500-ms period in which the eNodeB communicates data packets with two or less retransmissions.

In another example, the eNodeB may detect the threshold low extent of retransmissions by determining that the eNodeB has transmitted a predefined consecutive number of data packets to the UE without any retransmissions. For instance, the eNodeB may be configured to maintain a running count of the number of data packets transmitted without any retransmissions. Or if the eNodeB is configured to retransmit data packets in accordance with a HARQ procedure, the eNodeB may maintain a running count of the number of data packets transmitted to the UE for which the UE has provided an ACK. By way of example, each time the eNodeB receives an ACK, the eNodeB may increment the count. Further, each time the eNodeB increments the count, the eNodeB may compare the count to the predefined consecutive number. Meanwhile, if the UE provides a NACK or does not provide a response, the eNodeB may reset the count to zero. As with the other examples discussed above, the eNodeB or another RAN entity may dynamically set the predefined consecutive number based on load information, time of day, day of the week, etc.

Additionally, as discussed above, after transitioning from transmitting single-frame data packets to transmitting multi-frame data packets, upon detecting no longer the threshold low extent of retransmissions (or upon detecting a threshold high extent of retransmissions), the eNodeB may revert back to transmitting single-frame data packets during the VoLTE call. In practice, the eNodeB may detect no longer the threshold low extent of retransmissions in a number of ways. As one example, the eNodeB may determine that the count of retransmissions per statistical sliding window is no longer threshold low. Or the eNodeB may maintain a running count of the number of retransmissions after having transitioned to transmitting multi-frame data packets.

As an example, the eNodeB may receive from the UE requests to retransmit one or more particular data packets during the VoLTE call. For instance, if the eNodeB is configured to retransmit data packets to the UE in accordance with an HARQ procedure, the eNodeB may receive one or more NACKs from the UE, or not receive any response at all in response to a transmitted data packet. Each NACK or non-response may be counted as a retransmission request. Each time the eNodeB increments the count, the eNodeB may then compare the number of received retransmission requests to a threshold number (e.g., zero, one, two, etc.). And responsive to determining that the number of retransmission requests is greater than the threshold number of retransmission requests, the UE may revert back to transmitting single-frame data packets during the VoLTE call. Optionally, the eNodeB may reset the count on a periodic basis (e.g., every 200 ms, one second, etc.).

Although the examples above are described as being carried out by an eNodeB, in other examples, the UE may additionally or alternatively perform each of the various functions described above with respect to the eNodeB. For example, during the VoLTE call, the UE may monitor an extent of retransmissions by the UE to the eNodeB over time. Further, the UE may detect a threshold low extent of retransmissions by the UE to the eNodeB. And in response to detecting a threshold low extent of retransmissions during the VoLTE call, the UE may increase the extent of concatenation of frames of media. For instance, the UE may transition from transmitting single-frame data packets to the eNodeB to transmitting multi-frame data packets to the eNodeB. Moreover, in some instances, after transitioning from transmitting single-frame data packets to transmitting multi-frame data packets, upon no longer detecting the threshold low extent of transmissions (or detecting a threshold high extent of retransmissions), the UE may revert back to transmitting single-frame data packets during the VoLTE call.

Further, in some examples, in response to a first device detecting a threshold low extent of retransmissions, the device may cause a second device to start concatenation of frames of media or increase an extent of concentration in the second device's transmissions to the first device. For instance, in response to the eNodeB detecting a threshold low extent of retransmissions, the eNodeB may signal to the UE and instruct the UE to begin transmitting multi-frame data packets to the eNodeB. As an example, the eNodeB may provide a message to the UE that causes the UE to transition from transmitting single-frame data packets to transmitting multi-frame data-packets. Likewise, in response to the UE detecting a threshold low extent of retransmissions, the UE may signal to the eNodeB and instruct the eNodeB to start transmitting multi-frame data packets to the eNodeB.

Figure 2:
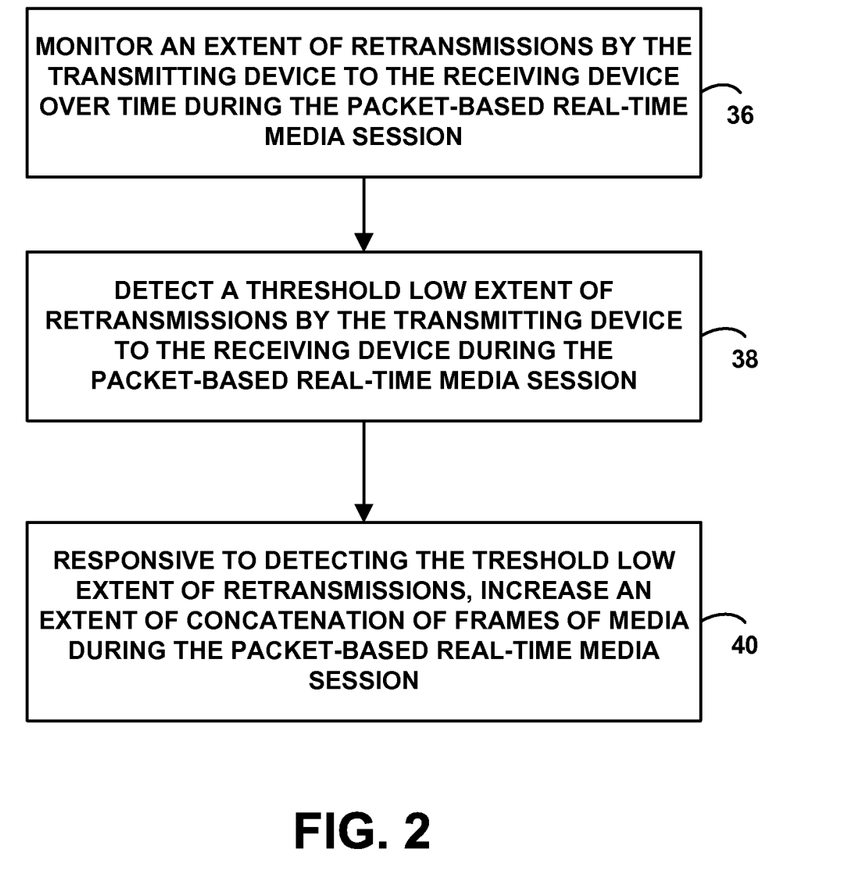
FIG. 2 is a flow chart depicting functions of a method that can be implemented in accordance with the disclosure.

FIG. 2 is a flow chart depicting some of these functions, as functions carried out by a transmitting device such as by an eNodeB or a UE. In line with the discussion above, the transmitting device may engage in a packet-based real-time media session with a receiving device over an air interface. For instance, as discussed above, the packet-based real-time media session may be VoIP session and perhaps particularly a VoLTE session. Further, the transmitting device may be configured to retransmit data packets to the receiving device during the packet-based real-time media session in accordance with an ARQ procedure, such as a HARQ procedure in an LTE network.

As shown in FIG. 2, at block 36, the transmitting device monitors an extent of retransmissions by the transmitting device to the receiving device over time during the packet-based real-time media session. For instance, in line with the discussion above, the transmitting device may determine an extent of retransmissions during a defined time period. Or the transmitting device may determine a consecutive number of data packets transmitted to the receiving device without any retransmissions.

At block 38, the transmitting device detects a threshold low extent of retransmissions by the transmitting device to the receiving device during the packet-based real-time media session. In line with the discussion above, the transmitting device may determine that a number of retransmissions by the transmitting device during a defined time period is less than a threshold number of retransmissions. Or the transmitting device may determine that a consecutive number of data packets transmitted to the receiving device without any retransmissions is greater than a predefined threshold number.

And in turn, at block 40, responsive to detecting the threshold low extent of retransmissions, the transmitting device increases an extent of concatenation of frames of media during the packet-based real-time media session. In line with the discussion above, the transmitting device may transition from transmitting single-frame data packets representing individual frames of media respectively to transmitting multi-frame data packets representing at least two concatenated individual frames of media together within a single data packet. In the arrangement of FIG. 1, for instance, during a VoLTE call, the eNodeB 16 may transition from transmitting single-frame data packets representing individual voice frames respectively to transmitting multi-frame data packets representing at least two concatenated voice frames together within a single data packet.

Figure 3:
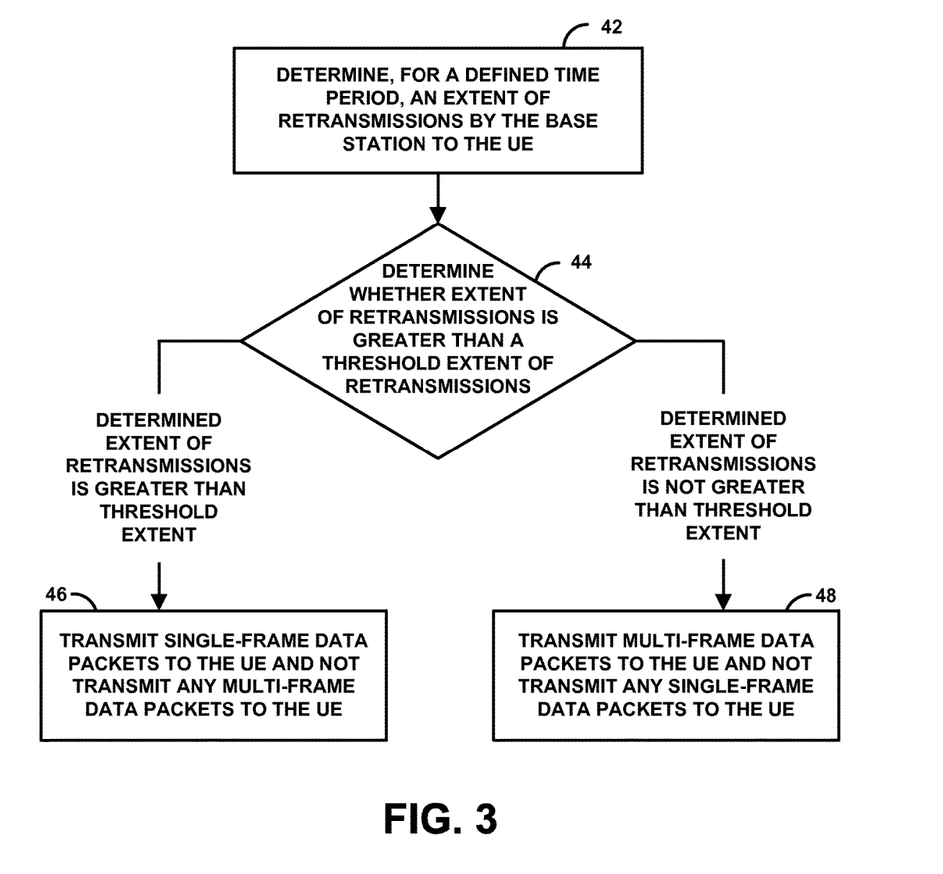
FIG. 3 is another flow chart depicting functions of a method that can be implemented in accordance with the disclosure.

FIG. 3 is next another flow chart depicting functions that can be carried out to manage wireless communication in a RAN in which a base station communicates a sequence of data packets to a UE over an air interface. For instance, the base station may communicate data packets to a UE over an air interface during a packet-based real-time media session such as a VoIP session. In line with the discussion above, the base station may be configured to retransmit particular data packets of the sequence of data packets to the UE in accordance with an ARQ procedure.

As shown in FIG. 3, at block 42, the base station determines, for a defined time period, an extent of retransmissions by the base station to the UE. Further, at block 44, the base station determines whether the determined extent of retransmissions is greater than a threshold extent of retransmissions.

And at blocks 46 and 48, the base station then transmits data packets to the UE based on whether or not the determined extent of retransmissions is greater than the threshold extent of retransmissions. In particular, if the determined extent of retransmissions is greater than the threshold extent of retransmissions, then, at block 46, the base station transmits single frame-data packets to the UE and does not transmit any multi-frame data packets to the UE. Whereas, if the determined extent of retransmissions is not greater than the threshold extent of retransmissions, then, at block

48, the base station transmits multi-frame data packets to the UE and does not transmit any single-frame data packets to the UE.

Figure 4:
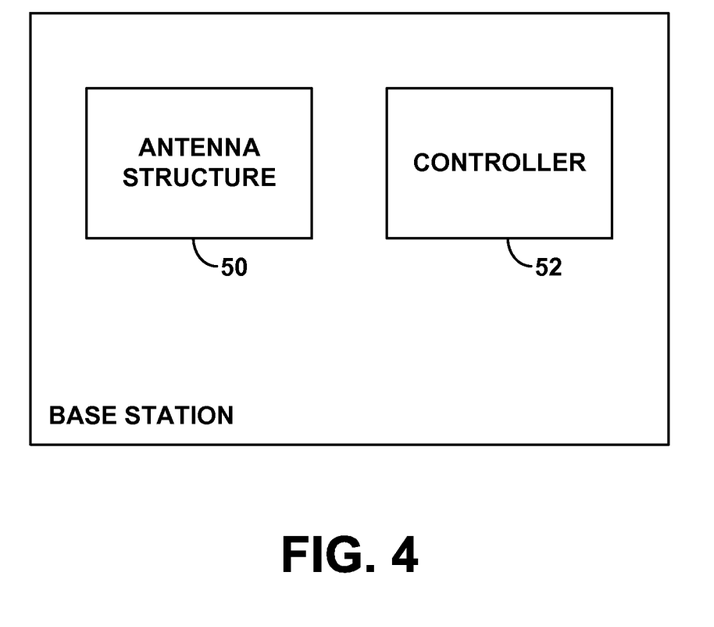
FIG. 4 is a simplified block diagram of an example base station that could carry out features of this disclosure.

Finally, FIG. 4 is a simplified block diagram of an example base station such as eNodeB 16, showing some of the components of such a base station that could be provided to facilitate implementation of functions such as those described above. As shown in FIG. 4, the example base station includes an antenna structure 50 that radiates to define a coverage area for serving UEs. Further, the example base station includes a controller 52 that manages wireless communication via the antenna structure.

In practice, for instance, the controller may include at least one processing unit, data storage, and program instructions stored in the data storage and executable by the at least one processing unit to carry out various functions. For example, the functions may include determining, for a defined time period, an extent of retransmissions by the base station to a UE during a packet-based real-time media session with the UE. Further, the functions may include using the determined extent of retransmissions as a basis to decide on an extent of concatenation of frames of media. For instance, in line with the discussion above, the base station may use the determined extent of retransmissions as a basis to decide whether to transmit to the UE single-frame data packets representing individual frames of media respectively or rather to transmit multi-frame data packets representing at least two concatenated individual frames of media together within a single data packet. And the functions may include causing the base station to transmit, in accordance with the decision, at least one data packet to the UE.

Exemplary embodiments of the present invention have been described above. Those skilled in the art will understand, however, that changes and modifications may be made to these embodiments without departing from the true scope and spirit of the invention, which is defined by the claims.

We claim:

1. A method for managing wireless communication in a radio access network (RAN) in which a transmitting device engages in a voice over Internet Protocol (VoIP) session with a receiving device over an air interface, wherein the transmitting device transmits individual data packets representing one or more respective voice frames to the receiving device during the VoIP session, and wherein the transmitting device is configured to retransmit data packets to the receiving device during the VoIP session in accordance with an automatic repeat request (ARQ) procedure, the method comprising:

the transmitting device monitoring an extent of retransmissions by the transmitting device to the receiving device over time during the VoIP session;

the transmitting device detecting a threshold low extent of retransmissions by the transmitting device to the receiving device during the VoIP session, wherein detecting the threshold low extent of retransmissions by the transmitting device to the receiving device during the VoIP session comprises determining that, for a defined time period, the receiving device has acknowledged receipt of each data packet that the transmitting device transmitted without the receiving device requesting retransmission of the data packet; and responsive to detecting the threshold low extent of retransmissions, the transmitting device increasing a quantity of voice frames represented per data packet during the VoIP session, wherein increasing the quantity of voice frames represented per data packet during the VoIP session comprises transitioning from transmitting single-frame data packets representing only a single respective voice frame per data packet to transmitting multi-frame data packets representing at least two adjacent, concatenated voice frames per data packet, and wherein each of the voice frames corresponds to a same duration of speech such that the multi-frame data packets represent at least twice as much time as the single-frame data packets.

2. The method of claim 1, further comprising:

after transitioning from transmitting single-frame data packets to transmitting multi-frame data packets, the transmitting device detecting no longer the threshold low extent of retransmissions; and responsive to detecting no longer the threshold low extent of retransmissions, the transmitting device reverting back to transmitting single-frame data packets during the VoIP session.

3. The method of claim 1, further comprising the transmitting device dynamically setting a length of the defined time period based on a value of at least one parameter selected from the group consisting of: load information for the RAN, time of day, and day of week.

4. The method of claim 1, wherein the air interface is a Long Term Evolution (LTE) air interface, and wherein the VoIP session is a voice over LTE (VoLTE) session.

5. The method of claim 1, wherein the transmitting device is a base station.

6. The method of claim 1, wherein the transmitting device is a user equipment device (UE).

7. A base station operable to engage in voice over Internet Protocol (VoIP) sessions with user equipment devices (UEs) over an air interface, wherein the base station is configured to transmit individual data packets representing one or more respective voice frames during the VoIP sessions, the base station comprising:

an antenna structure that radiates to define a coverage area for serving the UEs; and a controller that manages wireless communication via the antenna structure, wherein the controller comprises at least one processing unit, data storage, and program instructions stored in the data storage and executable by the at least one processing unit to carry out functions comprising:

(a) determining, for a defined time period, an extent of data-packet retransmissions by the base station to a UE during a VoIP session with the UE, wherein determining the extent of data-packet retransmissions by the base station to the UE comprises determining that the UE has acknowledged receipt of each data packet that the base station transmitted without the UE requesting retransmission of the data packet, (b) using the determined extent of data-packet retransmissions as a basis to decide on a quantity of voice frames represented per data packet during the VoIP session, and (c) causing the base station to transmit, in accordance with the decision, at least one data packet to the UE, wherein the controller is arranged to cause the base station to transmit single-frame data packets representing only a single respective voice frame per data packet responsive to determining that the determined extent of data-packet retransmissions is greater than a threshold extent of data-packet retransmissions, but to cause the base station to transmit multi-frame data packets representing at least two adjacent, concatenated voice frames per data packet responsive to determining that the determined extent of data-packet retransmissions is not greater than the threshold extent of data-packet retransmissions, and wherein each of the voice frames corresponds to a same duration of speech such that the multi-frame data packets represent at least twice as much time as the single-frame data packets.

8. The base station of claim 7, wherein the functions further comprise dynamically setting a length of the defined time period based on a value of at least one parameter selected from the group consisting of: load information for the base station, time of day, and day of week.

9. The base station of claim 7, wherein the base station comprises a Long Term Evolution (LTE) eNodeB, and wherein the VoIP session is a voice over LTE (VoLTE) session.

10. A method for managing wireless communication in a radio access network (RAN) in which a base station communicates a sequence of data packets to a user equipment device (UE) over an air interface during a voice over Internet Protocol (VoIP) session, wherein individual data packets of the sequence of data packets represent a quantity of one or more voice frames, and wherein the base station is configured to retransmit particular data packets of the sequence of data packets to the UE in accordance with an automatic repeat request (ARQ) procedure, the method comprising:

the base station determining, for a defined time period during the VoIP session, an extent of data-packet retransmissions by the base station to the UE, wherein determining the extent of data-packet retransmissions by the base station to the UE comprises determining that, for the defined time period during the VoIP session, the UE has acknowledged receipt of each data packet that the base station transmitted without the UE requesting retransmission of the data packet;

the base station using the determined extent of data-packet retransmissions as a basis to decide on a quantity of voice frames represented per data packet, wherein the base station using the determined extent of data-packet retransmissions as a basis to decide on the quantity of voice frames represented per data packet comprises:

responsive to determining that the extent of data-packet retransmissions is greater than a threshold extent of data-packet retransmissions, then, based on the extent of data-packet retransmissions being greater than the threshold extent of data-packet retransmissions, the base station deciding to transmit to the UE single-frame data packets representing only a single respective voice frame per data packet, but responsive to determining that the extent of data-packet retransmissions is not greater than the threshold extent of data-packet retransmissions, then, based on the extent of data-packet retransmissions not being greater than the threshold extent of data-packet retransmissions, the base station deciding to transmit to the UE multi-frame data packets representing at least two adjacent, concatenated voice frames per data packet; and the base station transmitting, in accordance with the decision, at least one data packet of the sequence of data packets to the UE, wherein each of the voice frames corresponds to a same duration of speech such that the multi-frame data packets represent at least twice as much time as the single-frame data packets.

* * * * *